Sept. 16, 1924.   1,508,547
T. J. GENTLE ET AL
ATTACHMENT FOR VEHICLE WHEELS
Filed Feb. 20, 1923
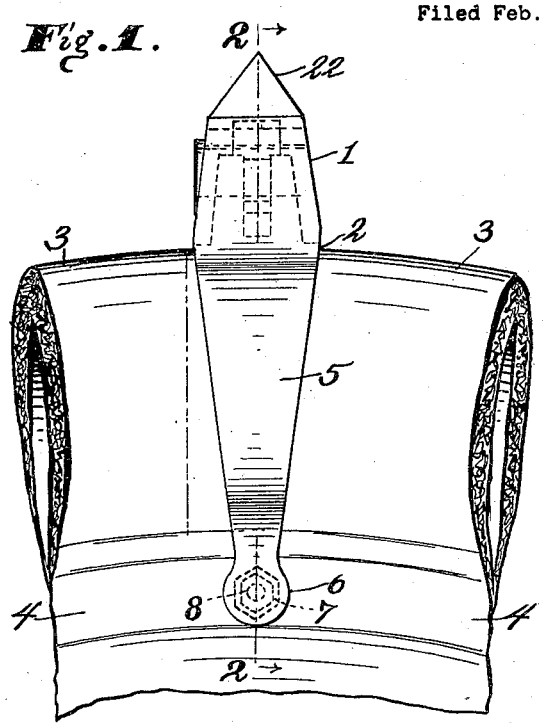
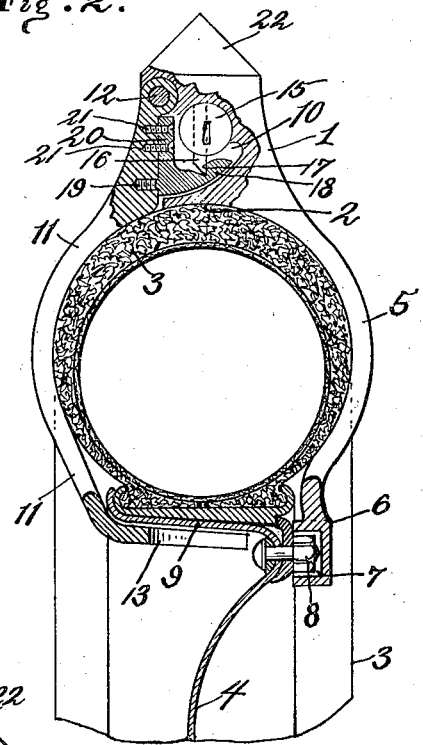
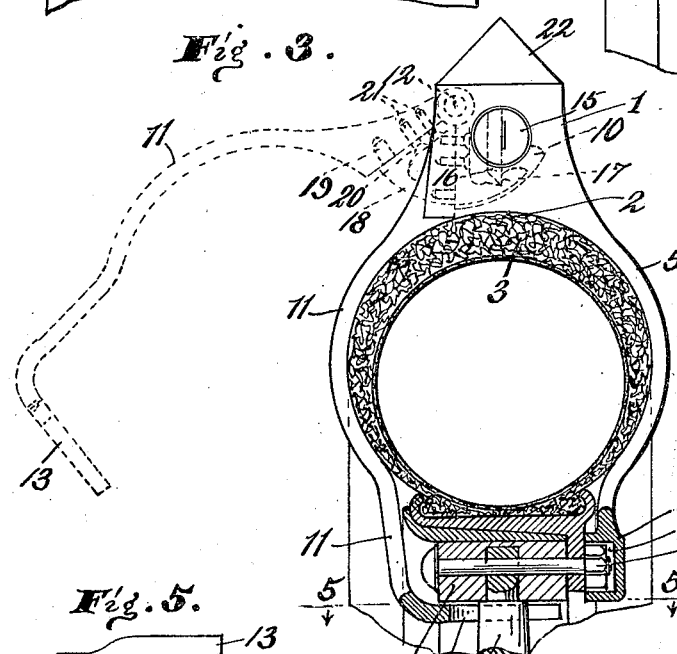
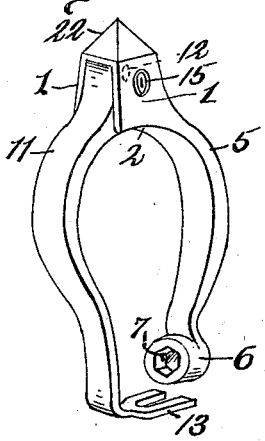
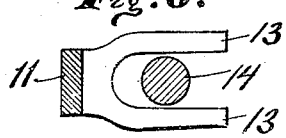
Inventors.
Thomas J. Gentle and
Reginald V. Tryon.
by
William W. Gentle
Their Attorney.
Witness:
Ellen Cate Patented Sept. 16, 1924.

1,508,547

UNITED STATES PATENT OFFICE.

THOMAS J. GENTLE AND REGINALD V. TRYON, OF LOS ANGELES, CALIFORNIA.

ATTACHMENT FOR VEHICLE WHEELS.

Application filed February 20, 1923. Serial No. 620,194.

*To all whom it may concern:*

Be it known that we, THOMAS J. GENTLE and REGINALD V. TRYON, citizens of the United States, residing at Los Angeles, in the county of Los Angeles and State of California, have invented a new and useful Attachment for Vehicle Wheels, of which the following is a specification.

This invention relates to atttachments for automobile wheels the purpose of which is to make it difficult for thieves to steal automobiles without attracting the attention of other car drivers and persons; which purpose of attracting attention is accomplished by providing an attachment to be locked to one of the wheels of an automobile not in use that will cause the wheel to travel with an intermittent, accentuated rise and fall if the car is moved that will readily attract the attention of other car drivers and persons so that they will know that it is a stolen car; as attachments of this kind are now commonly known and are used to indicate that a moving automobile with an attachment of this nature locked to a wheel is a stolen car.

An object of this invention is to provide an attachment that can be locked to various kinds of automobile wheels, and when connected thereto will remain in a relatively fixed position on the wheel even if the tire is deflated. Heretofore the purpose of attachments of this nature have been defeated by the thieves deflating the tires sufficient to turn the attachments side-wise to the wheel and then re-inflating the tire in which position the appliance does not attract attention when the car is moved; and an object of this invention is to provide an attachment that cannot be moved side-wise when locked to the wheel; but will remain with its tread point extended outward from the periphery of the wheel in which position it can perform its function satisfactorily.

An object of this invention is to provide an appliance that can be locked to disk, webbed, wire and spoke formed wheels. It is well known that there are appliances of this nature for spoke formed wheels that cannot be fitted to disk wheels and vice versa; and an object of this invention is to provide a locking attachment that can be fitted to the several kinds of automobile wheels.

A feature of the invention is shown in the novel construction of the locking arms that are provided with means for holding the attachment in a relatively fixed position on a wheel so that it cannot creep, be turned to one side of the tire or displaced on the wheel.

A feature of the invention is shown in the construction, combination and arrangement of various parts whereby a strong, durable, efficient, and neat appearing appliance is provided.

Other objects, advantages and features of invention may appear from the accompanying drawing, the subjoined detail description and the appended claims.

The accompanying drawing illustrates the invention.

Figure 1 is a fragmental view of a portion of a disk wheel with an attachment constructed in accordance with this invention connected thereto and shown in side elevation.

Fig. 2 is a fragmental cross section on the staggered line 2—2, Fig. 1, showing the attachment in locked position on a disk wheel.

Fig. 3 is a sectional view analogous to Fig. 2 of a modification, showing the attachment in locked position on a spoke wheel; also showing by dotted lines the movable arm thereof in unlocked position.

Fig. 4 is a perspective view of the attachment on a reduced scale.

Fig. 5 is a fragmental section on line 5—5, Fig. 3, showing the forked end of the hinged arm astride of a spoke of a wheel.

The attachment comprises a tread body 1 that is provided with a curved seat 2 that is adapted to fit over a tread portion of a tire 3 of an automobile wheel 4. The body 1 is provided with a rigid arm 5 that has one end integral with the body; and a portion of this arm is curved to fit the curved side of the tire 3, and the free end 6 of this arm is enlarged and provided with a socket 7 that can be fitted over one of the nuts or bolt heads 8 that are adjacent the felly 9 of the wheel 4. Nearly all vehicle wheels have bolts and nuts adjacent the fellies thereof; to which the end 6 can be fitted to prevent the attachment from being turned sidewise to or displaced on the wheel.

The tread body 1 is recessed at 10 to receive one end of a hinged arm 11 that is pivotally connected to the body by a pin 12; and this arm also has a portion thereof that is curved to fit the side contour of the tire so that when the appliance is locked to a wheel the body 1 and major portion of the arms 5, 11 fit snugly to the tire 3.

The hinged arm 11 is longer than the rigid arm 5, and it is provided with a forked extension 13 that is adapted to extend across or parallel with a portion of the wheel felly 9, and lie astride a spoke 14 when locked to a spoke wheel as shown in Figs. 3, 5, and this extension prevents the attachment from being moved around the wheel's axis; and also co-acts with the arm 5 in holding the attachment from turning side-wise, creeping or being displaced.

The appliance is provided with a lock 15 that can be of any desired construction, that will actuate the bolt 16 to engage a notch 17 in the curved finger 18 that is secured to the hinged arm 11.

The finger 18 is preferably formed with an integral threaded stud 19 that is secured to the arm 11; and to additionally secure the finger in place there is provided an integral extension 20 from the finger that is secured by screws 21 to the arm; and the finger 18 and associated parts are all within the recess 10 when the appliance is locked so that they are inaccessible; and so that an ordinary thief could not easily remove them to displace the attachment, or so that it can only be removed from a wheel by operating the lock to disengage the bolt 16 from the notch 17; and preferably all the parts are formed of hardened metal that will not readily yield to tools or files.

In use the appliance is fitted to a wheel as shown with either the socket of arm 5 fitted over a nut or bolt head 8 or the forked end of arm 11 astride a spoke 14 and the lock operated to engage the bolt 16 with notch 17 in which position the appliance cannot easily be displaced on the wheel; and also as shown the appliance can be fitted to either disk or spoke formed wheels. When the appliance is connected to a wheel the tread projection 22 of the body 1 is in position to intermittently engage the ground and cause the wheel to rise and fall when the automobile is moving, which unusual action will readily attract the attention of other car drivers.

We claim.

1. An attachment for a wheel comprising a tread body; a rigid arm integral with said body said arm having its free end enlarged and provided with a nut socket; a hinged arm pivotally connected to said body said hinged arm having a forked extension adapted to project across the inside periphery of a felly when attached to a wheel; and means connected with said body for locking said hinged arm.

2. An attachment for a wheel comprising a tread body having a tread projection; a rigid arm integral with said body said arm bent to the side curvature of a wheel tire; a hinged arm pivotally connected to said body said hinged arm having a forked extension adapted to project across the inside periphery of a felly when attached to a wheel; a notched finger on said hinged arm that is adapted to extend into and be locked in said body.

3. An attachment for a wheel having bolt heads and nuts adjacent the felly thereof; a tread body to said attachment, said body having a curved seat adapted to be fitted to the outer periphery of a tire; a pointed tread projection on said body; a rigid curved arm integral with said body, said arm having a socket adjacent its free end that is adapted to be fitted over a nut or bolt head adjacent the felly to hold said attachment from side-wise displacement when secured to a wheel; a hinged curved arm pivotally connected to said body; a forked extension on said movable arm, said extension adapted to be fitted over a spoke to prevent movement of said attachment around the axis of said wheel; a notched finger on said hinged arm said finger adapted to be moved into and out of said body; and means for locking said finger in said body to hold said attachment to a wheel.

In testimony whereof, we have hereunto set our hands at Los Angeles, California this 14 day of February, 1923.

THOMAS J. GENTLE.
REGINALD V. TRYON.

Witness:
W. M. GENTLE.